United States Patent [19]

Anderson et al.

[11] Patent Number: 4,913,208

[45] Date of Patent: Apr. 3, 1990

[54] PNEUMATIC RADIAL-PLY TIRE HAVING BLOCK PATTERN TREAD

[75] Inventors: Norman D. Anderson, Uniontown, Ohio; Harold D. Fetty, Asheville, N.C.; Deborah K. Vaughn, Mogadore, Ohio

[73] Assignee: The Goodyear Tire & Rubber Company, Akron, Ohio

[21] Appl. No.: 146,658

[22] Filed: Jan. 21, 1988

[51] Int. Cl.$^4$ .............................................. B60C 11/06
[52] U.S. Cl. .................................. 152/209 R; 152/534
[58] Field of Search .......... 152/209 R, 209 A, 209 D, 152/209 B, 534, 535; D12/136, 140–145, 146–151

[56] References Cited

U.S. PATENT DOCUMENTS

| | | | |
|---|---|---|---|
| D. 236,969 | 9/1975 | Blankenship et al. | D12/142 |
| D. 261,494 | 10/1981 | Suzuki et al. | D12/146 |
| D. 274,805 | 7/1984 | Dalmas | D12/146 |
| D. 283,996 | 5/1986 | Kuramuchi et al. | D12/147 |
| D. 288,083 | 2/1987 | Takeuchi | D12/148 |
| D. 300,812 | 4/1989 | Rabinovich | D12/147 |
| 3,233,649 | 2/1966 | Jolivet et al. | 152/534 X |
| 3,971,424 | 7/1976 | Boileau | 152/209 R |
| 4,262,720 | 4/1981 | Hanke | 152/209 D |
| 4,351,381 | 9/1982 | Roberts et al. | 152/209 R |
| 4,481,991 | 11/1984 | Pieper | 152/209 R |
| 4,546,808 | 10/1985 | Fontaine et al. | 152/209 R |
| 4,649,975 | 3/1987 | Kogure et al. | 152/209 R |
| 4,676,290 | 6/1987 | Tansei et al. | 152/209 R |
| 4,786,782 | 4/1988 | Kanamaru | 152/209 |

FOREIGN PATENT DOCUMENTS

| | | |
|---|---|---|
| 56457 | 7/1982 | European Pat. Off. ........ 152/209 D |
| 7442585 | 4/1975 | Fed. Rep. of Germany . |
| 2814945 | 10/1978 | Fed. Rep. of Germany . |
| 2279575 | 2/1976 | France . |
| 1594884 | 8/1981 | United Kingdom . |
| 980590 | 7/1982 | United Kingdom . |
| 1006180 | 1/1983 | United Kingdom . |
| 1038930 | 6/1987 | United Kingdom . |

OTHER PUBLICATIONS

1987 Tread Design Guide, ©1/87, p. 19, Cavalier SP 9000 H Tire 2nd Row dn from top, lt side of page.
1987 Tread Design Guide ©1/87, p. 78, Uniroyal Rallye St Tire, top left side of page.
1982 Tread Design Guide p. 19; Bridgestone RD-401 Steel (401v).

Primary Examiner—Michael W. Ball
Assistant Examiner—Geoffrey L. Knable
Attorney, Agent, or Firm—R. J. Slattery, III

[57] ABSTRACT

A pneumatic tire (10) having a tread (12), carcass (70), sidewalls (14), bead portions (18) and an annular reinforcing structure or belt structure (76). The tread (12) has two different types of circumferential grooves. Two circumferential straight grooves (20) divide the tire into three circumferentially extending portions (24,26,28). Each portion is further divided by a circumferentially extending zig-zag groove (22) or an "S" shaped groove. Each portion is then divided into blocks (30) by a plurality of axially extending grooves (32). The tread-reinforcing structure (76) has two belt plies (78,80) of steel cords (82), the cords of one are oriented at an angle A, with respect to the mid-circumferential centerplane (MC), while the cords of the other are oriented at an angle B, where angle B is less than angle A. The difference between angle A and angle B is greater than one degree and less than or equal to four degrees.

26 Claims, 10 Drawing Sheets

PNEUMATIC RADIAL-PLY TIRE HAVING BLOCK PATTERN TREAD

BACKGROUND OF THE INVENTION

The present invention relates to tires. Specifically this invention relates to pneumatic passenger or light truck tires.

As used herein including the claims, the following terms are defined as follows:

"Axial" and "axially" refer to directions and/or displacements that are parallel to the axis of rotation of a tire.

"Bead" means that part of the tire comprising an annular tensile member wrapped by ply cords and shaped to fit the design rim.

"Carcass" means the tire structure apart from the belt structure, tread, undertread, and sidewall rubber over the plies, but including the beads.

The "mid-circumferential centerplane" of a tire is a plane that is perpendicular to an axis of rotation of a tire and which is located midway between the external surfaces of the sidewalls of a tire at its maximum axial width exclusive of ornamentation or indicia.

"Radial" and "radially" refer to directions and/or displacements from the axis of rotation of the tire.

"Radial-ply tire" means a pneumatic tire in which the ply cords which extend from bead to bead are laid at cord angles between 75 degrees and 90 degrees with respect to the mid-circumferential centerplane of the tire.

"Sidewall" means that portion of a tire between the tread and the bead.

"Tread" means that portion of a tire that comes into contact with the road when the tire is normally inflated and under normal load.

"Tread width" means the arc length of the tread surface in the axial direction.

"Section width" means the linear distance parallel to the axis of the tire and between the exterior of its sidewalls when and after it has been inflated at normal pressure for 24 hours, but unloaded, excluding elevations of the sidewalls due to labeling, decoration or protective bands. "Ym" is the maximum section width.

"Section height", ("SH"), means the radial distance from the nominal rim diameter to the outer diameter of the tire.

BRIEF DESCRIPTION OF THE DRAWINGS

The following is a brief description of the drawings in which like parts bear like numerals and in which.

SUMMARY OF THE INVENTION

The tire of this invention is preferably a radial-ply pneumatic tire comprising a carcass having a circumferentially extending ground engaging tread disposed over it and a sidewall extending radially inwardly from each axial edge of the tread and having a circumferentially extending bead core therein. The carcass has at least one reinforcing ply extending from one bead region to the other bead region. Two belt plies are located between the tread region and the carcass and extend circumferentially about the carcass. Each belt ply has a plurality of parallel inextensible steel cords which are disposed within an elastomeric material.

The cords of the radially outer belt ply are oriented at a first cord angle while the cords of the radially inner belt ply are oriented at a second cord angle. The second cord angle is less than the first cord angle.

The tread is a specific configuration of a number of circumferentially extending grooves of two different sets. The grooves of the first set have a straight configuration and are spaced axially apart across the tread width to divide the tread into circumferentially extending portions. These circumferentially extending portions are further divided into arrays of blocks by axially extending grooves. The arrays of blocks are further divided by the second set of circumferentially extending grooves. The second set of grooves has a different configuration from the first set of grooves and further divides the blocks into two notched portions. The second set of circumferentially extending grooves may have a "S" shaped configuration or they may have a zig-zag configuration within the blocks.

The circumferentially extending grooves are full depth grooves and may be substantially equal in depth. However, it is preferred that each subsequent groove from the mid-circumferential centerplane be slightly deeper in depth from the previous one. The axially extending grooves may be full depth grooves also, but it is preferred that they be tie bar grooves. That is, grooves having a depth over a substantial portion of their length which is less than the depth of the full depth circumferentially extending grooves. The axially extending grooves may however have the same depth as the circumferentially extending grooves where both grooves intersect.

The axially extending grooves may be substantially parallel to one another and oriented at an angle with respect to the mid-circumferential centerplane of the tire. The axially extending grooves may be zig-zag grooves.

As a minimum the tire tread should have two circumferentially extending straight grooves, forming the first set of grooves and dividing the tire into three circumferentially extending portions, and three circumferentially extending grooves forming the second set of grooves such as zig-zag grooves, one groove disposed within each portion. The straight grooves may be larger in width than the zig-zag grooves.

One of the portions may be further comprised by the addition of another second set groove axially spaced from the other second set groove to form a rib therein.

Accordingly, it is believed that the resulting tire will have good traction, including wet traction, good handling, low noise generation and good ride characteristics.

DETAILED DESCRIPTION OF THE INVENTION

Figure 1:
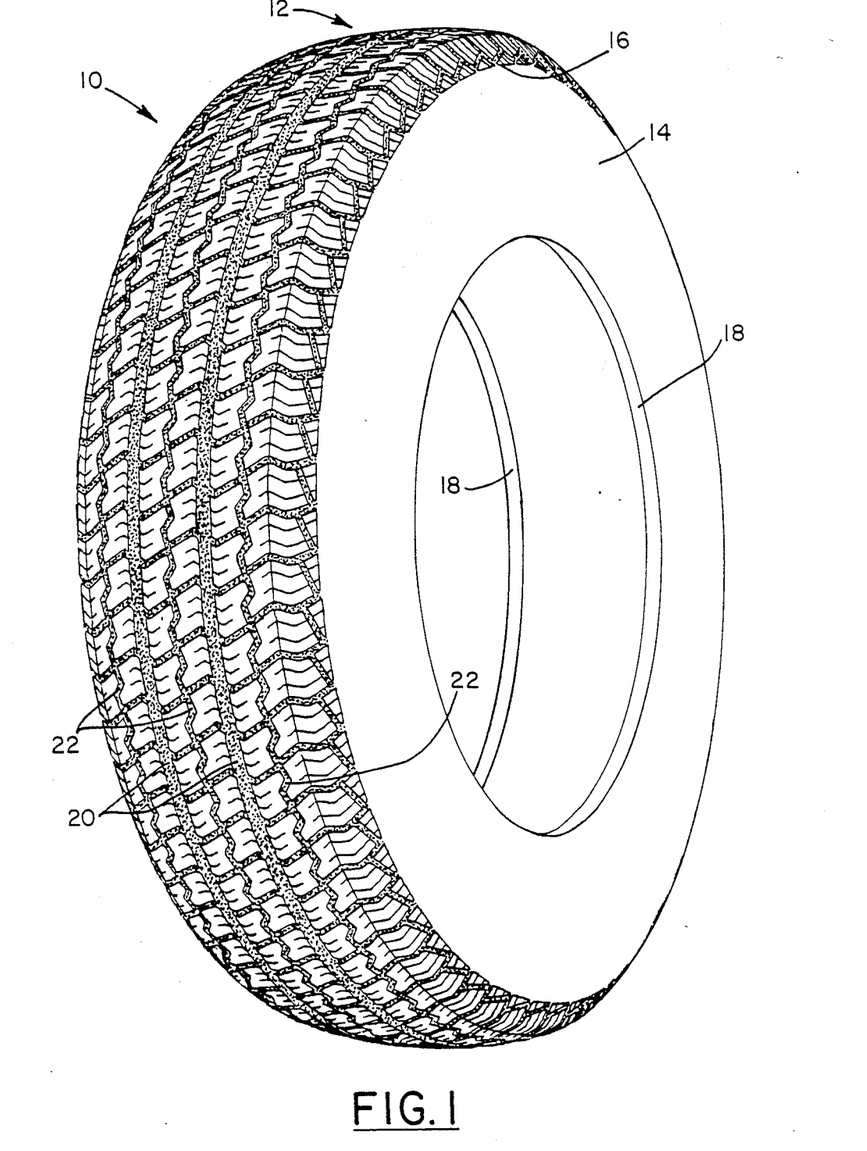
FIG. 1 is a perspective view of a tire according to one embodiment of this invention.
Figure 2:
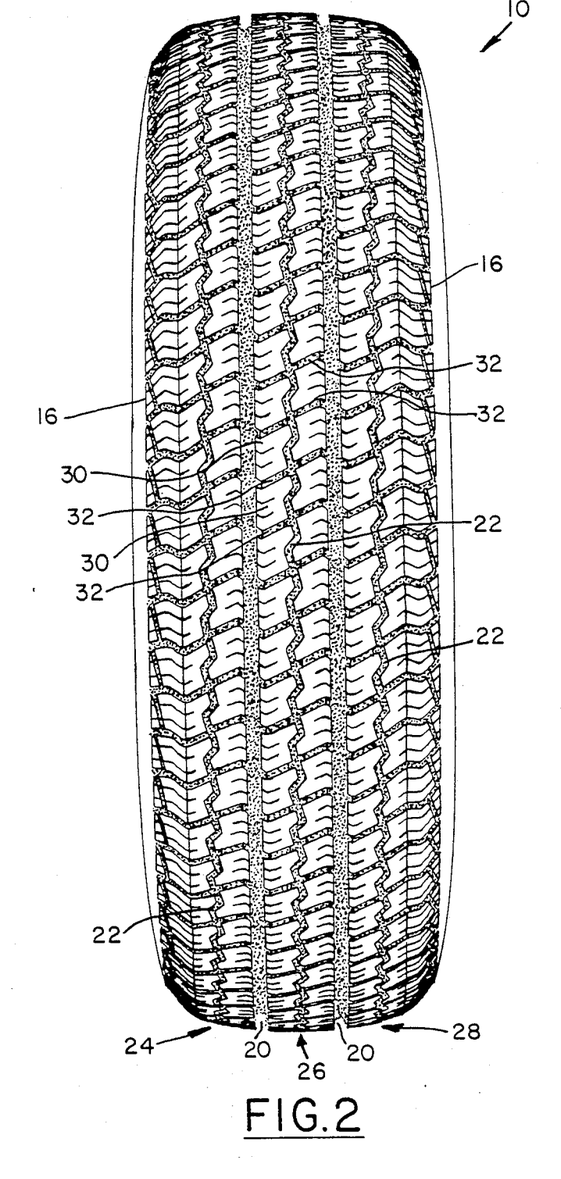
FIG. 2 is a front elevation of the tire illustrated in FIG. 1.
Figure 3:
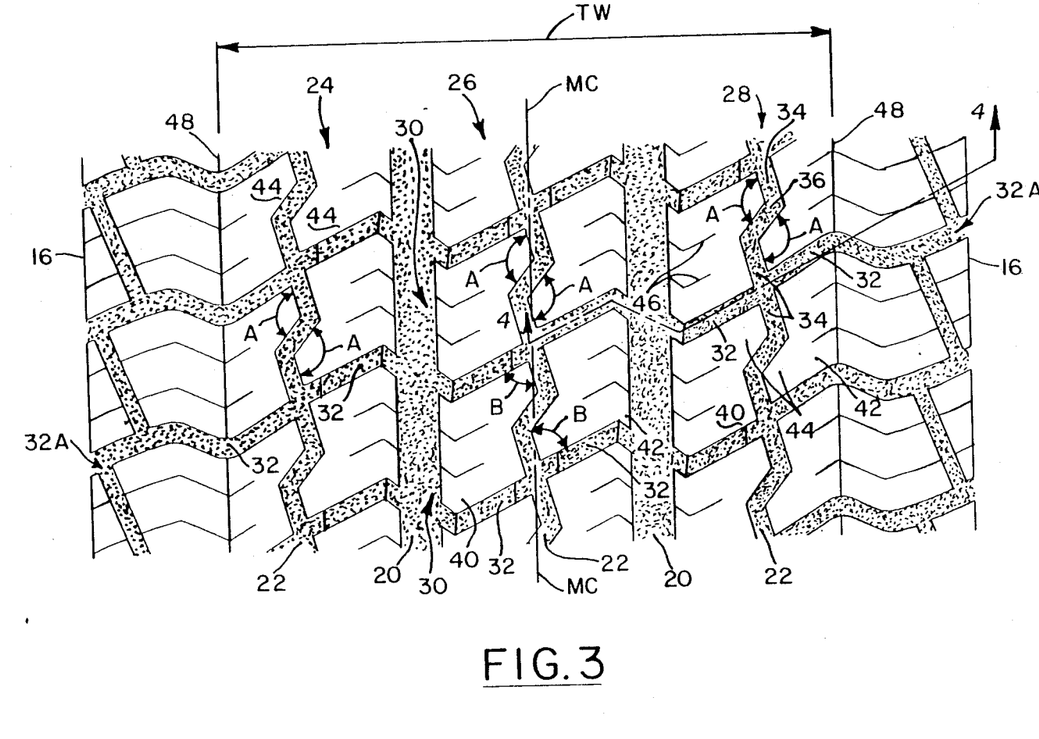
FIG. 3 is an enlarged fragmentary view of the tread portion of the tire of FIGS. 1 and 2.

Referring to FIGS. 1, 2 and 3 there is shown a tire 10 according to one embodiment of this invention. The tire 10 is preferably a radial-ply, pneumatic tire having a circumferentially extending tread portion 12 with a sidewall portion 14 extending radially inwardly from each axial edge 16 of the tread to an annular bead portion 18. The tread 12 and sidewalls 14 are comprised of a suitable elastomeric substance, such as a natural or synthetic rubber compound, selected in accordance with engineering standards that are widely known in the tire art.

The tread 12 has a number of circumferentially extending grooves of two different types shown generally as reference numerals 20 and 22. The first type of groove 20, is a straight groove which divides the tread 12 into circumferentially extending portions 24,26,28. These circumferentially extending portions are each further divided by the second type of circumferentially extending groove 22 to form a tread pattern which is arranged symmetrically with respect to the mid-circumferential centerplane of the tire MC-MC. The second type of circumferentially extending groove 22 has a different configuration from the straight grooves 20. In this particular embodiment, the circumferentially extending grooves of the second type are zig-zag grooves.

The circumferentially extending portions 24,26,28 are further divided into blocks 30 by a plurality of axially extending grooves 32.

Now referring specifically to FIG. 3, the zig-zag grooves 22 have alternating legs 34 and 36, alternating inclined in opposite directions with respect to the circumferential direction and which enclose an angle A. The angle A is in a range of about 110 degrees to about 145 degrees, with a more preferred range being from 115 degrees to 134 degrees depending upon the pitching sequence employed. Furthermore, the legs 34 of the zig-zag grooves 22 are inclined in the same direction with respect to the circumferential direction.

The axially extending grooves 32 intersect the legs 34 of the zig-zag groove 22 to enclose two angle A's between each groove 32. Although in this embodiment each leg 34 is divided by axially extending grooves, other designs need not have grooves 32 dividing every leg 34, for example they could be spaced every other one. The grooves 32 form an angle B with respect to the mid-circumferential centerplane of the tire, or planes parallel thereof, in the range from about 45 degrees to about 75 degrees with a more preferred range being from about 50 degrees to about 71 degrees. The grooves 32 circumferentially spaced about the tire tread may be substantially parallel to one another. However, the circumferential spacing and actual angle B for each groove 32 may vary according to the pitching sequence used. The grooves 32 may form zig-zag grooves extending from the circumferentially extending straight grooves 20 within the circumferentially extending portions. The axially extending grooves 32 may be slightly off-set from one another within each circumferentially extending portion or may be in linear alignment with each other to form a straight groove. The grooves 32 may be arranged such that they form a zig-zag groove 32A, extending from one axial tread edge 16 to the other.

The axially extending grooves 32 are shown as diagonal grooves which are sloped in the same direction, from right to left. However, it is readily apparent that they all could be sloped from left to right or that one portion, for example the middle portion 26, could be sloped in one direction and the outer two portions, 22 and 28, could be sloped in the opposite direction. Surprisingly, the diagonal groove alignment of this embodiment resulted in a low amount of noise generation. In the above, the straight grooves 20 are wider in width than either the circumferential zig-zag grooves 22 or the axially extending grooves 32. The blocks 30 are formed into two portions 40 and 42. Each portion has a notch 44 therein formed by the circumferentially extending groove 22. Each portion 40 and 42 may have two small thin grooves (blades or sipes) 46 which are equally spaced to provide uniform stiffness across the tread surface. Preferably the depth of each small thin groove 46 varies across its length within the portions 40 and 42.

The net to gross ratio, the total areas of the blocks to the total area of the tread, is equal to the nominal value of 0.63 in this embodiment. However the net to gross ratio could vary from 60 to 67.

The blocks 30 are aligned across the tread width TW such that the leading edge of each block does not strike the pavement during rotation of the tire at the same time. This results in lowering the noise level generated by the tire.

A circumferentially extending small thin groove (blade or sipe) 48 is located at the axial edge of the tread width TW. This circumferentially extending blade 48 provides for increased cooling of the adjacent elements or blocks. Reducing the heat generation associated with the tread in this region produces a corresponding reduction in the aging of the tread, thereby reducing the wear rate of the tread. Alternatively, the groove 48 may be omitted.

Figure 4:
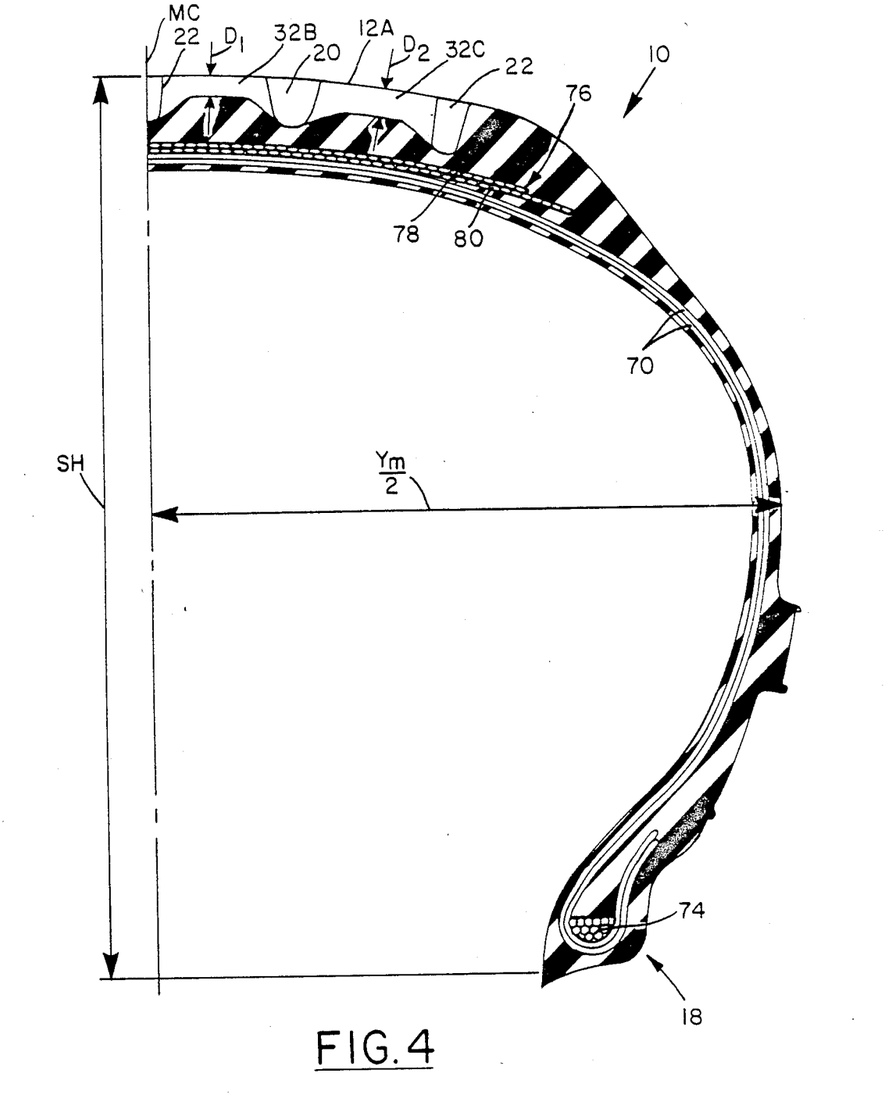
FIG. 4 is half of a radial cross-section of the tire of FIGS. 1 through 3.

Now referring also to FIG. 4, there is illustrated half of a radial cross-section of the pneumatic tire 10 taken along the line 4—4 of FIG. 3. The circumferentially extending grooves 20 and 22 are full depth grooves. However it is preferred that each subsequent circumferentially extending groove located axially from the mid-circumferential centerplane MC of the tire will have a greater depth than the previous one. For example, the straight groove 20 will have a depth which is greater than the zig-zag groove 22 located about the mid-circumferential centerplane MC and will have a depth which is less than the zig-zag groove 22 located near the tread edge. The axially extending grooves 32 may be full depth grooves but it is preferred that they have a depth which is less than the depth of the circumferentially extending grooves 20 and 22. Thus the grooves 32 may be considered to be tie bars. A tie bar is a portion of a groove that is shallower than the remainder of the groove and functions to brace the adjacent blocks. It is preferred that the depth of the axially extending grooves near the mid-circumferential centerplane MC be less than the depth of the grooves near the tread edge. For example, the depth D1 of the axially extending groove 32B is less than the depth D2 of the axially extending groove 32C as measured from the top of the tread surface 12A. The depth of the axially extending grooves may, however, be increased to be equal with the depth of the circumferentially extending grooves (20 and 22) where they intersect one another. This results in the grooves 32 having a depth which varies across its axial length. Furthermore, if the grooves 32 are arranged as above to produce axial zig-zag grooves 32A extending from one axial tread edge to the other, they will also have a depth which varies across their axial length.

The tire furthermore has one or more carcass-reinforcing plies 70 located radially inwardly of the tread portion 12 and extending to the bead portion 18 where they are anchored about substantially inextensible bead cores 74. The carcass-reinforcing plies comprise a number of parallel reinforcing elements or cords. The reinforcing elements or cords of the carcass ply may be polyester or other suitable material such as rayon, nylon or fiberglass.

An annular tread-reinforcing structure, or belt structure 76 is located radially inwardly of the tread portion and radially outwardly of the carcass-reinforcing plies 70. The belt structure 76 has two single layers of belts 78 and 80 of parallel cords embedded in an elastomeric material. One belt ply has cords oriented at a left cord angle with respect to the mid-circumferential plane MC of the tire. The other belt has cords oriented at a right cord angle with respect to the mid-circumferential plane MC of the tire.

Figure 5:
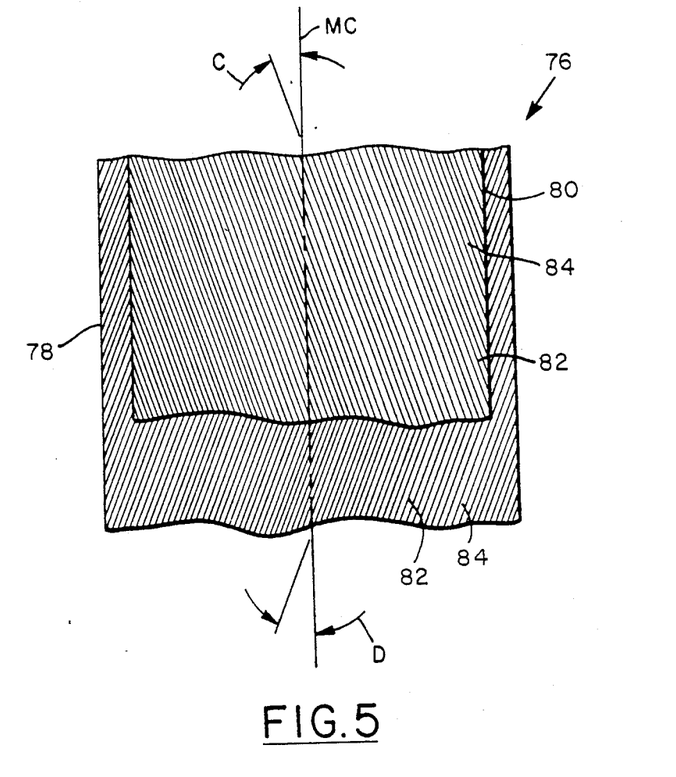
FIG. 5 is a partial view of the tread-reinforcing structure or belt package of FIG. 4.

Now referring to FIG. 5, there is illustrated a partial view of the annular tread-reinforcing structure or belt package 76 of FIG. 4. The radially outer belt 80 comprises a number of parallel steel cords 82 embedded in an elastomeric material 84 and oriented at a cord angle C with respect to the mid-circumferential centerplane MC of the tire. The cord angle C has a range from 20 degrees to 25 degrees with a more preferred range being from about 22 degrees to about 24 degrees.

The radially inner belt 78 also has a number of parallel steel cords 82 embedded in an elastomeric material 84 and oriented at a cord angle D with respect to the mid-circumferential centerplane of the tire. However the cord angle D is less than the cord angle C of the outer belt. The cord angle D has a range from 18 degrees to about 23 degrees while the more preferred range is from 20 degrees to about 22 degrees. Providing the radially outer belt with the higher cord angle results in a corresponding improvement in ride characteristics of the tire. If the angular difference between the radially outer cord angle C and the radially inner cord angle D is small the results will be an improvement in the ride of the tire without a corresponding loss in handling. However, if the angular difference becomes too great, there may be an improvement in ride, but this will be offset by a degradation in handling. It is believed that the angular difference should be within the range of greater than or equal to 1 degree and less than or equal to about 4 degrees. Two degrees has been found to be a good angular difference.

In the preferred embodiment the cords 82 of the radially inner belt 78 and radially outer belt 80 comprise two filaments of finely drawn high tensile steel wire twisted about one another. Preferably the filament diameter is 0.30 mm and its tensile elastic modulus is 190 GPa or greater. The cord is designated as 2×0.30 (HT), indicating a two filament twisted cord having filaments of 0.30 mm diameter of a high tensile steel wire, wherein high tensile is steel made with a carbon content by weight of 0.7 to 0.9% and preferably 0.82%.

Figure 6:
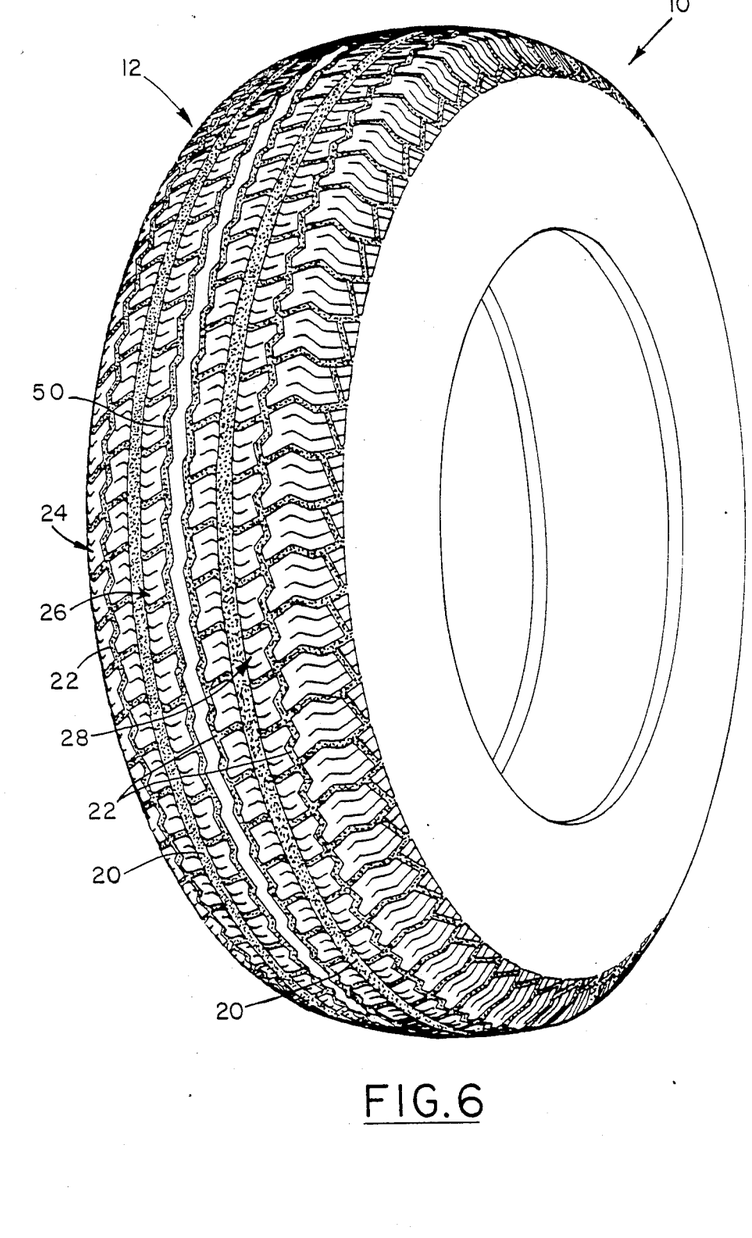
FIG. 6 is a perspective view of a tire according to another embodiment of this invention.
Figure 7:
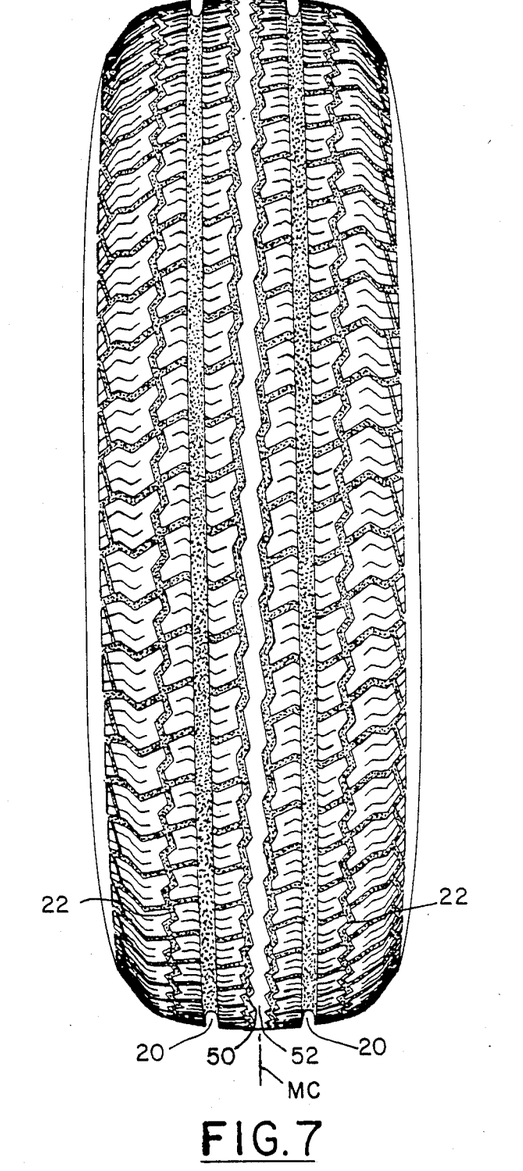
FIG. 7 is a front elevation of the tire illustrated in FIG. 6.
Figure 8:
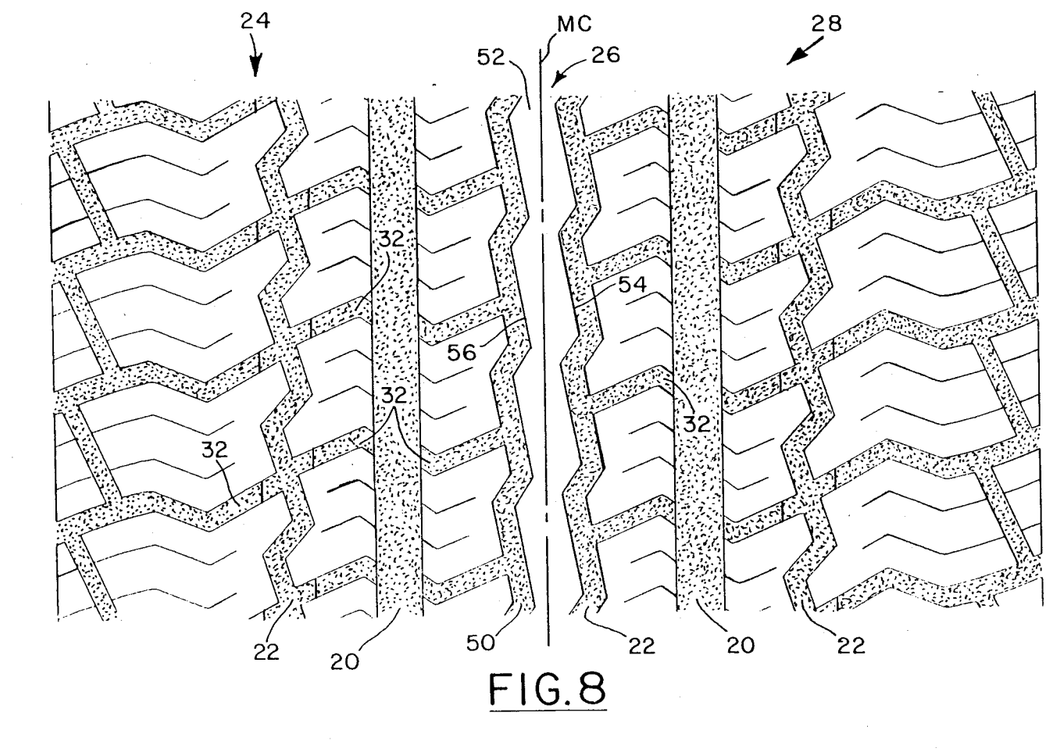
FIG. 8 is an enlarged fragmentary view of the tread portion of the tire of FIGS. 6 and 7.

Now referring to FIGS. 6, 7 and 8, there is illustrated another embodiment of this invention. The tread 12 of tire 10 is still divided into circumferentially extending tread portions 24,26,28 by circumferentially extending straight grooves 20 and each tread portion has a circumferentially extending zig-zag groove 22. However the middle portion 26 has an additional circumferentially extending zig-zag groove 50 axially spaced to produce a circumferentially extending rib 52.

The rib 52 is centrally located about the mid-circumferential centerplane MC. Preferably the rib is continuous without any axial breaks, that is without any notches, bladings, grooves, etc., which extend continuously across or through the rib from one axial edge 54 to the other axial edge 56. The circumferentially extending portions 24,26,28 are further divided by the axially extending grooves 32.

Figure 9:
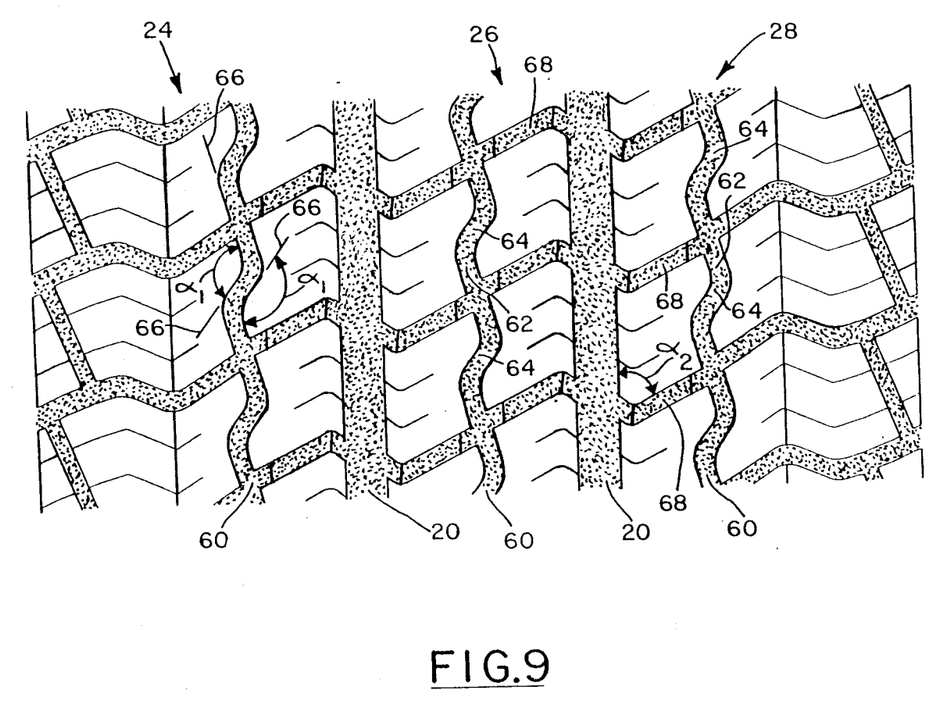
FIG. 9 is an enlarged fragmentary view of a tread portion of a tire according to another embodiment of this invention.

Now referring to FIG. 9, there is illustrated an enlarged fragmentary view of a tread portion of another embodiment of this invention. In this embodiment the circumferentially extending zig-zag grooves 22 of FIG. 3 are replaced with "S" shaped grooves 60.

The "S" shaped grooves 60 have legs 62 and 64. These legs form an angle $\alpha_1$ by extending tangent lines 66. Angle $\alpha_1$ has a range from about 110 degrees to about 145 degrees which corresponds to the range of angle A of FIG. 3. The "S" shaped grooves may be intersected by axially extending grooves which may be either straight or curved as shown by reference numeral 68. The axially extending curved grooves 68 may form an angle $\alpha_2$, by extending tangent lines as above, having a range from about 45 degrees to about 75 degrees corresponding to angle B of FIG. 3.

Figure 10:
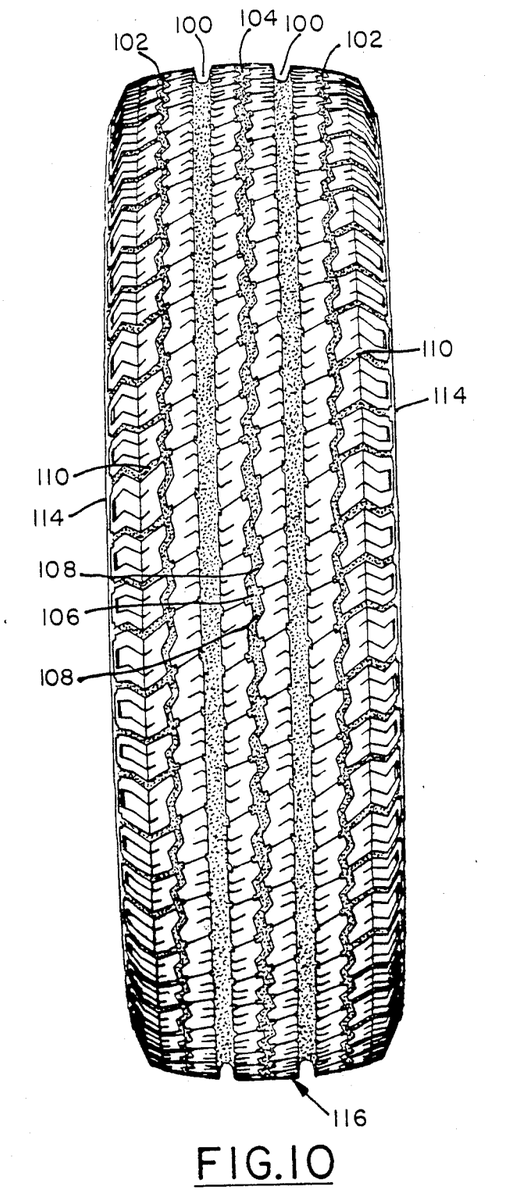
FIG. 10 is a front elevation of a tire according to another embodiment of this invention.

Now referring to FIG. 10 there is illustrated another embodiment of this invention. Two circumferentially extending straight grooves 100 divide the tire into three portions. The tread is further divided by three circumferentially extending zig-zag grooves, to axially outer grooves 102 and one middle groove 104. The circumferentially extending zig-zag grooves may have a width which varies, such as shown by the middle groove 104 wherein the width varies from one leg 106 to the other 108.

The axially extending grooves or diagonal grooves may comprise a combination of grooves of different widths. For example, the grooves 110 may be of one width while the grooves 112 may be smaller thin grooves such as blades. The grooves 110 may extend from the outer zig-zag grooves 102 to the axial edge of the tread 114. The smaller, thinner grooves 112 may extend from the straight grooves 100 to a zig-zag groove. By increasing the width of the middle zig-zag groove 104 and replacing some of the diagonal grooves with smaller thinner grooves results in keeping the net to gross ratio to approximately that of FIG. 1.

These descriptions and details have been shown for the purposes of illustrating this invention and it will become apparent to those skilled in the art that various changes and/or modifications may be made therein without departing from the original spirit or scope of the invention.

What is claimed is:

1. A radial-ply having a mid-circumferential centerplane and a tread portion, said tread portion comprising:
   two circumferentially extending straight grooves dividing said tread portion into three circumferentially extending portions;

each circumferentially extending portion having a first circumferentially extending zig-zag groove therein having a plurality of alternating first and second legs alternately inclined in opposite directions with respect to the circumferential direction, said first legs in said three portions being inclined in the same direction with respect to the circumferential direction;

a plurality of axially extending diagonal grooves interconnecting only with at least some of said first legs of said zig-zag grooves and dividing said circumferentially extending portions into blocks; and said blocks of each portion being aligned axially such that a leading edge of one said block does not strike the pavement during a rotation of the tire at the same time as another leading edge of another block.

2. The tire of claim 1 wherein said tread portion is further comprising one said circumferentially extending portion, centered about the mid-circumferential centerplane having a second circumferentially extending zig-zag groove therein having a plurality of alternating first and second legs, a rib axially disposed between said first circumferentially extending zig-zag groove and said second circumferentially extending zig-zag groove, and a plurality of axially extending grooves interconnecting with a plurality of first legs of said second zig-zag groove.

3. The tire of claim 1 or 2 wherein said axially extending grooves are oriented in a range of about 45 degrees to about 75 degrees with respect to the mid-circumferential plane of the tire.

4. The tire of claim 3 wherein said first and said second legs of said circumferentially extending zig-zag grooves, enclose an angle in a range of about 110 degrees to about 145 degrees with respect to the mid-circumferential plane.

5. The tire of claim 4 wherein said axially extending grooves have a depth over a substantial portion of their length less than the depth of the circumferentially extending straight and zig-zag grooves.

6. The tire of claim 5 wherein said axially extending grooves are substantially parallel to one another.

7. The tire of claim 6 wherein said circumferentially extending straight grooves have a width greater than the width of the zig-zag grooves.

8. The tire of claim 7 further comprising a blade groove located adjacent each axial edge of said tread portion.

9. A radial-ply tire having a tread portion comprising:
a plurality of circumferentially extending grooves spaced axially apart across the tread portion;
said circumferentially extending grooves comprising a first set of grooves having a substantially straight configuration and a second set of grooves of a different configuration;
said first set of grooves dividing the tread into circumferentially extending portions, each portion having a groove of said second set of circumferentially extending grooves disposed therein;
said second set of circumferentially extending grooves having a plurality of alternating first and second legs alternately inclined in opposite directions with respect to the circumferential direction, said first legs of said second set of circumferentially extending grooves being inclined in the same direction with respect to the circumferential direction, each first leg being joined at one end to an adjacent second leg and also being joined at another end to another adjacent second leg;

a plurality of axially extending diagonal grooves interconnecting with said second set of circumferentially extending grooves to divide each portion into an array of blocks, each axially extending groove interconnecting with only said first legs of a groove of the second set of circumferentially extending grooves; and said blocks of each portion being aligned axially such that a leading edge of one said block does not strike the pavement during a rotation of the tire at the same time as another leading edge of another block.

10. A tire as set forth in claim 9 wherein at least one said circumferentially extending portion further comprising a circumferentially extending rib disposed therein.

11. The tire of claims 9 or 10 wherein said axially extending grooves are oriented in a range of about 45 degrees to about 75 degrees with respect to the mid-circumferential centerplane of the tire.

12. The tire of claim 11 wherein the first and second legs of said second set of grooves enclosing an angle in a range of about 110 degrees to about 145 degrees.

13. The tire of claim 12 wherein the grooves of said second set of grooves have a zig-zag configuration.

14. The tire of claim 12 wherein the grooves of said second set of grooves have an "S" shaped configuration.

15. The tire of claim 12 wherein said axially extending grooves have a depth over a substantial portion of their length less than the depth of the circumferentially extending grooves.

16. The tire of claim 15 wherein said axially extending grooves are substantially parallel to one another.

17. The tire of claim 15 wherein said tread is further comprising a blade groove located adjacent each axial edge of said tread portion.

18. The tire of claim 9, 10, 11 or 12 wherein said axially extending grooves comprise zig-zag grooves.

19. The tire of claim 9 or 10 wherein said legs of said second set of grooves enclose an angle A, said axially extending grooves enclosing an angle B with respect to the mid-circumferential centerplane of the tire, and angle A being greater than angle B.

20. A radial-ply tire comprising:
a carcass;
a circumferentially extending ground engaging tread disposed radially outwardly of the carcass having a plurality of circumferentially extending grooves spaced axially apart across the tread portion, said circumferentially extending grooves comprising a first set of grooves having a substantially straight configuration and a second set of grooves of a different configuration, said first set of grooves dividing the tread into circumferentially extending portions, a plurality of axially extending diagonal grooves dividing each portion into an array of blocks, and said second set of circumferentially extending grooves dividing said blocks of each array into a first portion and a second portion, the grooves of said second set of circumferentially extending grooves comprising a plurality of alternating first and second legs alternately inclined in opposite directions with respect to the circumferential direction, said first legs of said second set of circumferentially extending grooves being inclined in the same direction with respect to the circumferential direction, each first leg being joined at one end to an adjacent second leg and joined at another end to another adjacent second leg and the axially extending grooves interconnecting with only the first legs of the grooves of said second set of circumferentially extending grooves;

said blocks of each portion being aligned axially such that a leading edge of one said block does not strike the pavement during a rotation of the tire at the same time as another leading edge of another block;

a sidewall region extending radially inwardly from each axial edge of the tread to an annular bead portion, each said annular bead portion having a circumferentially extending bead cord;

said carcass having at least one reinforcing ply extending from one bead portion to the other bead portion; and an annular tread reinforcing structure disposed between the tread and the carcass, having a first single belt ply disposed over a second single belt ply, each belt having a plurality of parallel inextensible metallic cords disposed within an elastomeric material, the cords of the first belt ply oriented at a first angle with respect to a mid-circumferential plane, the cords of the second belt ply oriented at a second angle with respect to the mid-circumferential plane, said second angle being less than said first angle.

21. The tire according to claim 20 wherein:

the angular difference between the first cord angle and the second cord angle, is within a range of greater than or equal to 1 degree and less than or equal to 4 degrees; and said axially extending grooves are oriented in a range of about 45 degrees to about 75 degrees with respect to the mid-circumferential centerplane of the tire, and said second set of grooves having legs, said legs, with respect to the mid-circumferential plane, enclosing an angle in a range of about 110 degrees to about 145 degrees.

22. The tire of claim 21 wherein:

said first angle is in a range of about 20 degrees to about 25 degrees: and said second angle is in a range of about 18 degrees to about 23 degrees.

23. The tire of claim 22 wherein said second set of grooves have a zig-zag configuration within said blocks.

24. The tire of claim 22 wherein said second set of grooves have an "S" shaped configuration within said blocks.

25. A tire as set forth in claim 22 wherein at least one said array of blocks further comprising a circumferentially extending rib disposed axially between said first and said second notched portions of said blocks.

26. A tire as set forth in claims 9, 10, 11, 12 or 23 wherein the net to gross ratio is in the range of 60 to 67.

* * * * *